(12) United States Patent
Musungu et al.

(10) Patent No.: US 7,002,764 B2
(45) Date of Patent: Feb. 21, 2006

(54) METHOD AND APPARATUS FOR PROVIDING GENERALIZED WRITE PRE-COMPENSATION

(75) Inventors: Firmin M. Musungu, Rochester, MN (US); Joey M. Poss, Rochester, MN (US); Brent A. Sadowy, Rochester, MN (US)

(73) Assignee: Hitachi Global Storage Technologies Netherlands B.V., (NL)

(*) Notice: Subject to any disclaimer, the term of this patent is extended or adjusted under 35 U.S.C. 154(b) by 0 days.

(21) Appl. No.: 10/787,291

(22) Filed: Feb. 26, 2004

(65) Prior Publication Data
US 2005/0190473 A1 Sep. 1, 2005

(51) Int. Cl.
*G11B 5/09* (2006.01)
(52) U.S. Cl. .......................................... 360/51; 360/68
(58) Field of Classification Search ..................... None
See application file for complete search history.

(56) References Cited

U.S. PATENT DOCUMENTS

| | | | |
|---|---|---|---|
| 4,885,645 A | 12/1989 | Hashimoto | |
| 5,359,631 A | 10/1994 | Behrens et al. | |
| 5,734,680 A * | 3/1998 | Moore et al. | ............... 375/263 |
| 5,872,665 A | 2/1999 | Millican et al. | |
| 5,986,830 A | 11/1999 | Hein | |
| 6,091,558 A | 7/2000 | Voorman et al. | |
| 6,134,691 A | 10/2000 | Hirasaka | |
| 6,337,778 B1 * | 1/2002 | Gagne | ........................ 360/51 |
| 6,369,661 B1 | 4/2002 | Scott et al. | |
| 6,426,662 B1 | 7/2002 | Arcus | |
| 2002/0015247 A1 | 2/2002 | Rosky et al. | |

OTHER PUBLICATIONS

Lixin Yang, Yijun Zhou and Jiren Yuan, "A Non-Feedback Multiphase Clock Generator," *Proceedings of 2002 IEEE International Symposium on Circuits and Systems*, vol. 4, May 2002, pp. 389-392.

* cited by examiner

*Primary Examiner*—Alan T. Faber
(74) *Attorney, Agent, or Firm*—Chambliss, Bahner & Stophel, P.C.; David W. Lynch

(57) ABSTRACT

A method and apparatus providing generalized write pre-compensation is disclosed. The present invention provides multiple phase signals to choose from for provide a shift to received write data to achieve a desired pre-compensation.

34 Claims, 17 Drawing Sheets

| NRZI Data | PreComp State | Customer Setting | Decoder Select |
|---|---|---|---|
| 0 1 0 | 0 | 0% | FP8 |
| 0 1 1 | 1 | -12.5% | FP0 |
| 1 1 0 | 2 | +23.4% | FP23 |
| 1 1 1 | 3 | +12.5% | FP16 |

| NRZI Data | PreComp State | Customer Setting | Decoder Select |
|---|---|---|---|
| 0 0 <u>1</u> 0 | 0 | 0% | FP8 |
| 0 0 <u>1</u> 1 | 1 | -12.5% | FP0 |
| 0 1 <u>1</u> 0 | 2 | +23.4% | FP23 |
| 0 1 <u>1</u> 1 | 3 | +12.5% | FP16 |
| 1 0 <u>1</u> 0 | 4 | +3.1% | FP10 |
| 1 0 <u>1</u> 1 | 5 | +12.5% | FP16 |
| 1 1 <u>1</u> 0 | 6 | +18.8% | FP20 |
| 1 1 <u>1</u> 1 | 7 | +12.5% | FP16 |

| NRZI Data | PreComp State | Customer Setting | Decoder Select |
|---|---|---|---|
| 0 0 <u>1</u> 0 0 | 0 | -12.5% | FP0 |
| 0 0 <u>1</u> 0 1 | 1 | -9.4% | FP2 |
| \| | \| | \| | \| |
| \| | \| | \| | \| |
| 1 1 <u>1</u> 1 0 | 15 | +23.4% | FP23 |
| 1 1 <u>1</u> 1 1 | 16 | +12.5% | FP16 |

| Coarse Phase Select @ | |
|---|---|
| 1710 M=1 | 1712 M=2 |
| 0° | 0° |
| 22.5° | 45° |
| 45° | 90° |
| 67.5° | 135° |
| 90° | 180° |
| 112° | 225° |
| 135° | 270° |

Fig. 17

METHOD AND APPARATUS FOR PROVIDING GENERALIZED WRITE PRE-COMPENSATION

CROSS-REFERENCE TO RELATED APPLICATIONS

This application is related to the following co-pending and commonly-assigned patent application, which is hereby incorporated herein by reference in its respective entirety: "METHOD AND APPARATUS FOR PROVIDING WRITE PRE-COMPENSATION USING A READ TIMING PATH" to Musungu et al., having Ser. No. 10/787,308.

BACKGROUND OF THE INVENTION

1. Field of the Invention

This invention relates in general to data processing, and more particularly to a method and apparatus for a method and apparatus for providing generalized write pre-compensation.

2. Description of Related Art

Recently developed data storage devices, such as magnetic disk drive devices (i.e., hard disk drives), have increased storage capacity and increased data access speed. With these advantages, magnetic disk drive devices have become widely used as auxiliary memory devices for computer systems. More generally, developments in pulse communications related to these improvements in disk drive technology have recently provided increased speed and reliability in a wide range of pulse communications systems. The present invention will be described in detail in the context of magnetic disk drive devices, but persons skilled in the pulse communications arts will readily apprehend that this invention provides an improved method for data pulse detection in a wide variety of pulse communication contexts.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modern magnetic disk drive devices.

A read channel circuit in a generic read/write channel circuit of a magnetic disk drive device includes components for initial processing of the analog read signal generated by the read/write head of the device. This processing provides automatic gain control (AGC) amplification, filtering, and equalization, as well as analog-to-digital conversion.

In a magnetic disk or tape data storage device, data is commonly stored on a magnetic medium by saturation recording in which each portion of the medium is magnetized to the point of saturation in one of two directions. The data to be stored is typically encoded to satisfy certain constraints and the encoded data is used to modulate the direction of magnetization. In a coded representation known as NRZI (non return to zero invert), each "one" bit of the encoded data causes a transition in the direction of magnetization, while each "zero" bit of the encoded data causes the magnetization direction to remain unchanged. In NRZ, there are no neutral or rest condition, such as a zero amplitude in amplitude modulation (AM), zero phase shift in phase-shift keying (PSK), or mid-frequency in frequency-shift keying (FSK). Note: For a given data signaling rate, i.e., bit rate, the NRZ code requires only one-half the bandwidth required by Manchester coding. With NRZ coding, 1's may be used to indicate magnet polarity change of, while 0's may be used to indicate no change in polarity change. A clock signal is used to write a sequence of encoded NRZI bits as a recording head moves along a track on the medium such that one bit is written at each clock tick.

When a read head is passed over the recorded data track, a voltage pulse is produced at each transition in magnetization. Successive voltage pulses have opposite polarity since successive magnetic transitions are in opposite directions. The written NRZI data sequence may be reconstructed from the resulting voltage waveform by associating a "one" bit with every clock tick at which a pulse occurs and a "zero" bit with every clock tick at which no pulse occurs. The original user data may then be decoded from the NRZI data.

To recover the written or transmitted data sequence, the receiver requires a clock signal synchronized with the received waveform. At each tick of this synchronized clock signal the receiver or read circuitry generates one bit of the NRZI data sequence by processing the surrounding waveform. It is often impossible or at least undesirable to store or transmit a separate synchronized clock signal with the data waveform. Instead, constraints are applied to the encoded NRZI data sequence to ensure that timing information may be extracted from the data waveform itself and used to "recover" a synchronized clock signal. Such a system is referred to as "self clocking". Nonlinear bit shift (NLBS) in magnetic recording is the shift in position of a written transition due to the proximity effect of a preceding transition. In PRML, the readback waveform is synchronously sampled at regular intervals. Sample values depend on the position of written transitions. Therefore an unwanted shift, such as a nonlinear bit shift, leads to error in sample values that, in turn, degrades the performance of the PRML channel.

Write pre-compensation is a method to shift the write data timing in a direction to aid in pre-equalizing the signal. This optimizes the eventual readback signal; i.e., write signal modified based on prediction of what write signal will produce the cleanest readback signal using an understanding of physical/magnetic properties, i.e., predicting effects of distortion from magnets before/after that location before writing a magnet on magnetic media. As magnets are written on a disk media, close magnets can partially erase each other as unwanted signal timing shift. Write pre-compensation can aid in fixing this problem. The media magnets may require substantial amounts of write pre-compensation based on adjacent magnets. Even if magnets are two or three magnets apart (1 0 0 1), the partial erasure influence could be significant enough to affect read back performance. Another phenomena is 'north' and 'south' (N or S) can have timing asymmetry either from the write driver, head or media influences. Timing asymmetry correction is similar to pre-compensation in that it involves a shifting of write signal timing, even though timing asymmetry correction is performed for different reason/factors. Timing asymmetry correction provides a timing shift that is determined more by electronics, of a computer or HDD read channel, instead of magnetic factors. Being able to correct write timing asymmetry and provide write pre-compensation will improve read signal performance. It is desireable to have variable amounts of pre-compensation on a magnet-by-magnet basis based on the write sequence.

Today's high-density recording demands require grater flexibility in write pre-compensation. Currently, write pre-compensation methods rely on a stand-alone circuit that requires extra design time. Known solutions all have an architecture that limit the number of pre-compensation states available on a cycle-to-cycle basis.

It can be seen then that there is a need for a method and apparatus for a method and apparatus for providing generalized write pre-compensation.

SUMMARY OF THE INVENTION

To overcome the limitations in the prior art described above, and to overcome other limitations that will become apparent upon reading and understanding the present specification, the present invention discloses a method and apparatus for a method and apparatus for providing generalized write pre-compensation.

The present invention solves the above-described problems by providing multiple phase signals to choose from for provide a shift to received write data to achieve a desired pre-compensation.

A system in accordance with the principles of the present invention includes a coarse phase generator for generating N coarse phase signals, a fine phase generator, coupled to the coarse phase generator, for using the N coarse phase signals to generate M fine phase signals and a write pre-compensation circuit, coupled to the fine phase generator, for choosing a fine phase signal from the M fine phase signals to provide a shift to received write data to achieve a first desired pre-compensation.

In another embodiment of the present invention, a magnetic storage device is provided. The magnetic storage device includes a magnetic storage medium for recording data thereon, a motor for moving the magnetic storage medium, a head for reading and writing data on the magnetic storage medium, an actuator for positioning the head relative to the magnetic storage medium and a data channel for processing encoded signals on the magnetic storage medium, the data channel comprising a coarse phase generator for generating N coarse phase signals, a fine phase generator, coupled to the coarse phase generator, for using the N coarse phase signals to generate M fine phase signals and a write pre-compensation circuit, coupled to the fine phase generator, for choosing a fine phase signal from the M fine phase signals to provide a shift to received write data to achieve a first desired pre-compensation.

In another embodiment of the present invention, a method for providing generalized write pre-compensation is provided. The method includes generating N coarse phase signals, using the N coarse phase signals to generate M fine phase signals and choosing a fine phase signal from the M fine phase signals to provide a shift to received write data to achieve a first desired pre-compensation.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 13 shows an example of a customer setting for pre-compensation and the decoder select based on the NRZI write data for a 4-state pre-compensation according to an embodiment of the present invention;

FIG. 14 shows an example of how an 8-state pre-compensation may be decoded according to an embodiment of the present invention;

FIG. 15 shows a partial table of how a 16-state decoder may be implemented according to an embodiment of the present invention;

FIG. 17 shows a coarse phase Mux block that selects a different set of coarse phases when M=2.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for method and apparatus for a method and apparatus for providing generalized write pre-compensation. The present invention provides multiple phase signals to choose from for provide a shift to received write data to achieve a desired pre-compensation.

Figure 1:
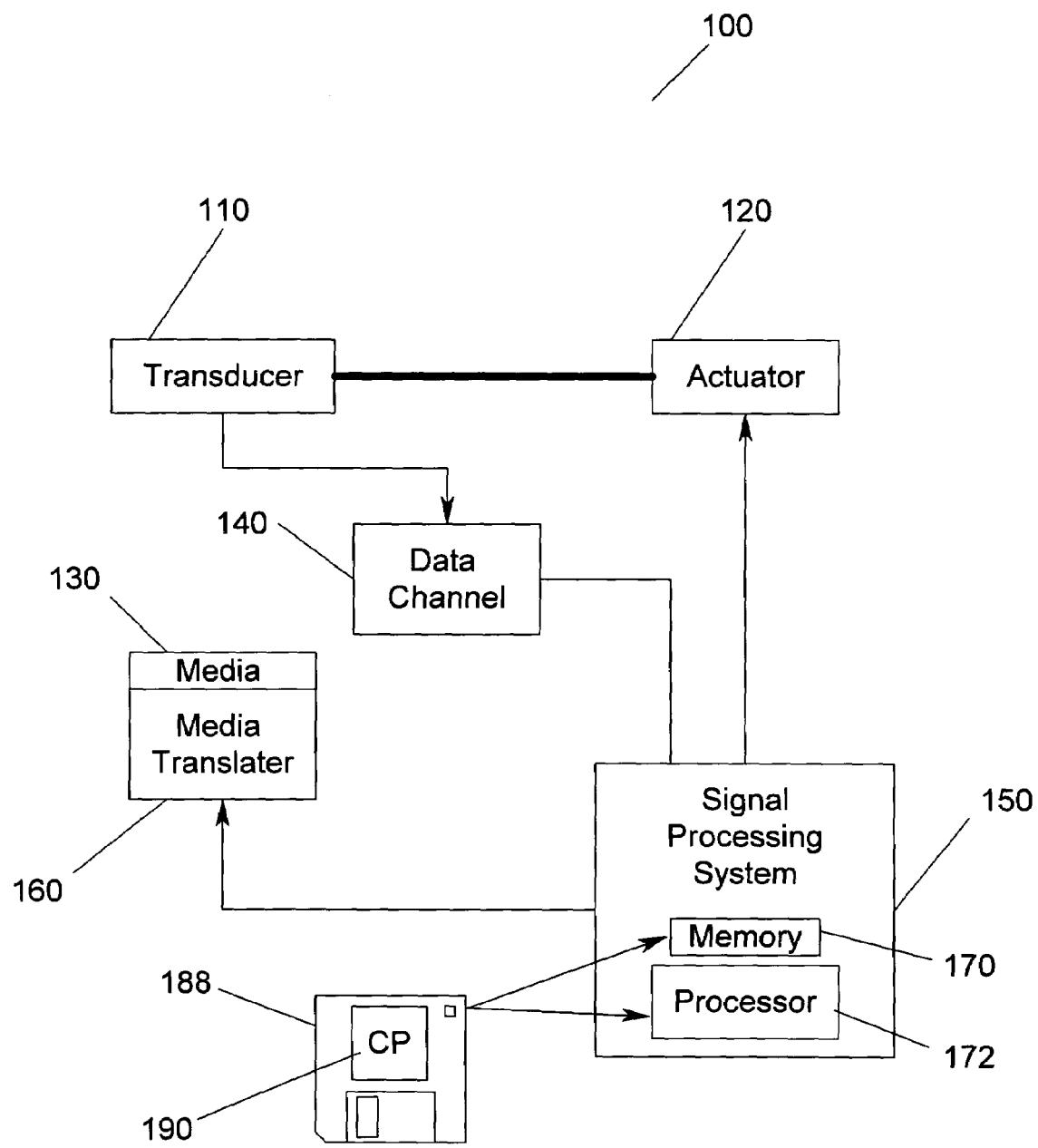
FIG. 1 illustrates a storage system according to an embodiment of the present invention.

FIG. 1 illustrates a storage system 100 according to an embodiment of the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. Nevertheless, the present invention is not meant to be limited to a particular type of storage system 100 or to the type of media 130 used in the storage system 100.

Figure 2:
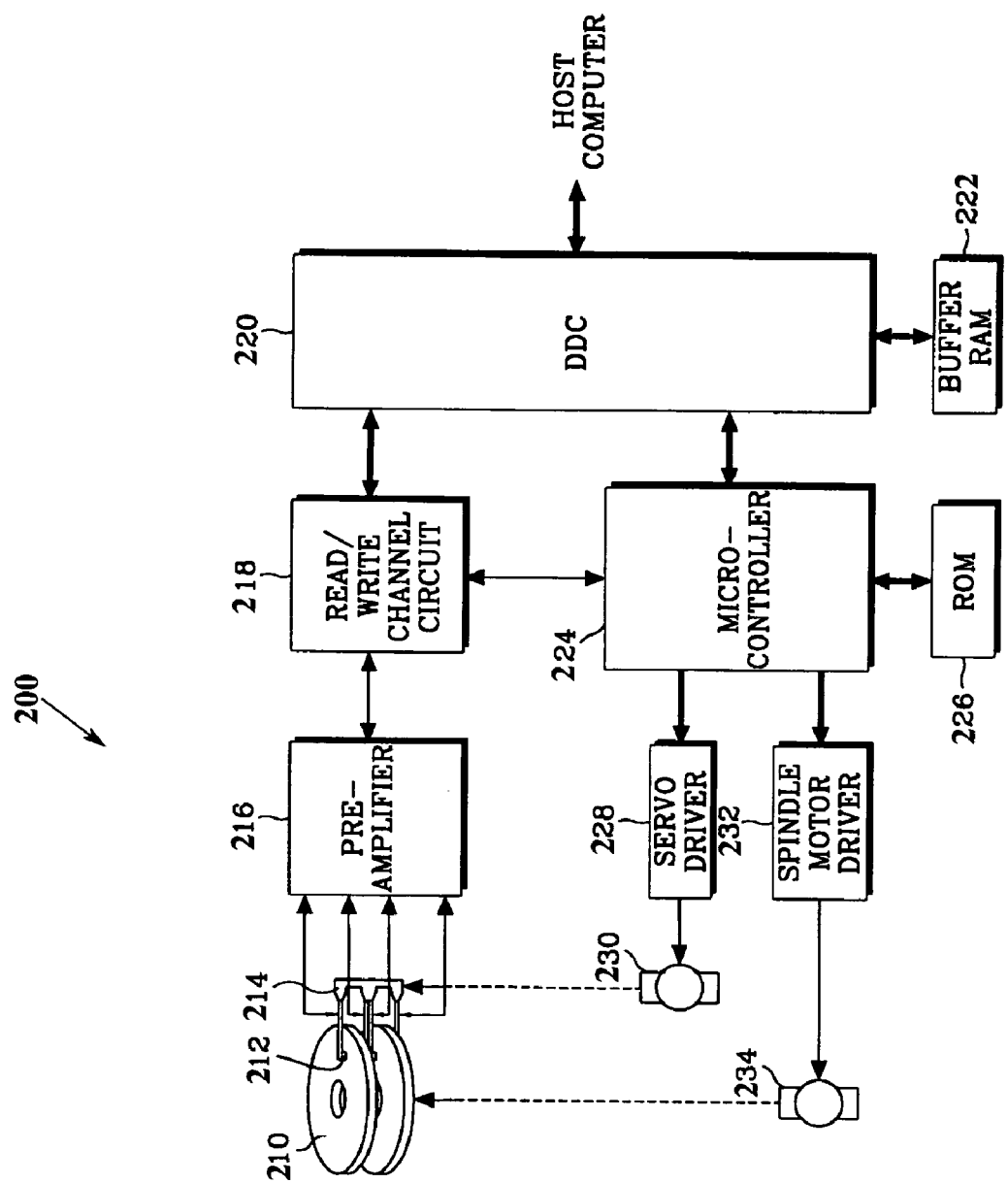
FIG. 2 is a block diagram of a magnetic disk drive device according to an embodiment of the present invention.

FIG. 2 is a block diagram of a magnetic disk drive device 200 according to an embodiment of the present invention. In FIG. 2, disks 210 are rotated by a spindle motor 234, and heads 212 are positioned at surfaces of corresponding ones of disks 210. Heads 212 are mounted on corresponding servo arms that extend from an E-shaped block assembly 214 to disks 210. Block assembly 214 has an associated rotary voice coil actuator 230 that moves block assembly 214 and thereby changes to positions of heads 212 for reading data from or writing data to a specified position on one or more of disks 210.

A pre-amplifier 216 pre-amplifies a signal picked up by heads 212 and thereby provides read/write channel circuit 218 with an amplified signal during a reading operation. During a write operation, pre-amplifier 216 transfers an encoded write data signal from the read/write channel circuit 218 to heads 212. In a read operation, read/write channel circuit 218 detects a data pulse from a read signal provided by pre-amplifier 216 and decodes the data pulse. Read/write channel circuit 218 transfers the decoded data pulse to a disk data controller (DDC) 20. Furthermore, read/write channel circuit 218 also decodes write data received from the DDC 220 and provides the decoded data to pre-amplifier 216.

DDC 220 both writes data received from a host computer (not shown) onto disks 210, through read/write channel circuit 218 and pre-amplifier 216, and transfers read data from disks 210 to the host computer. DDC 220 also interfaces between the host computer and a microcontroller 224. A buffer RAM (Random Access Memory) 222 temporarily stores data transferred between DDC 220 and the host computer, microcontroller 224, and read/write channel circuit 218. Microcontroller 224 controls track seeking and track following functions in response to read and write commands from the host computer.

A ROM (Read Only Memory) 226 stores a control program for microcontroller 224 as well as various setting values. A servo driver 228 generates a driving current for driving actuator 230 in response to a control signal, generated from microcontroller 224 that provides control of the position of heads 212. The driving current is applied to a voice coil of actuator 230. Actuator 230 positions heads 212 relative to disks 210 in accordance with the direction and amount of the driving current supplied from servo driver 228. A spindle motor driver 232 drives spindle motor 234, which rotates disks 210, in accordance with a control value generated from microcontroller 224 for controlling disks 210.

Figure 3:
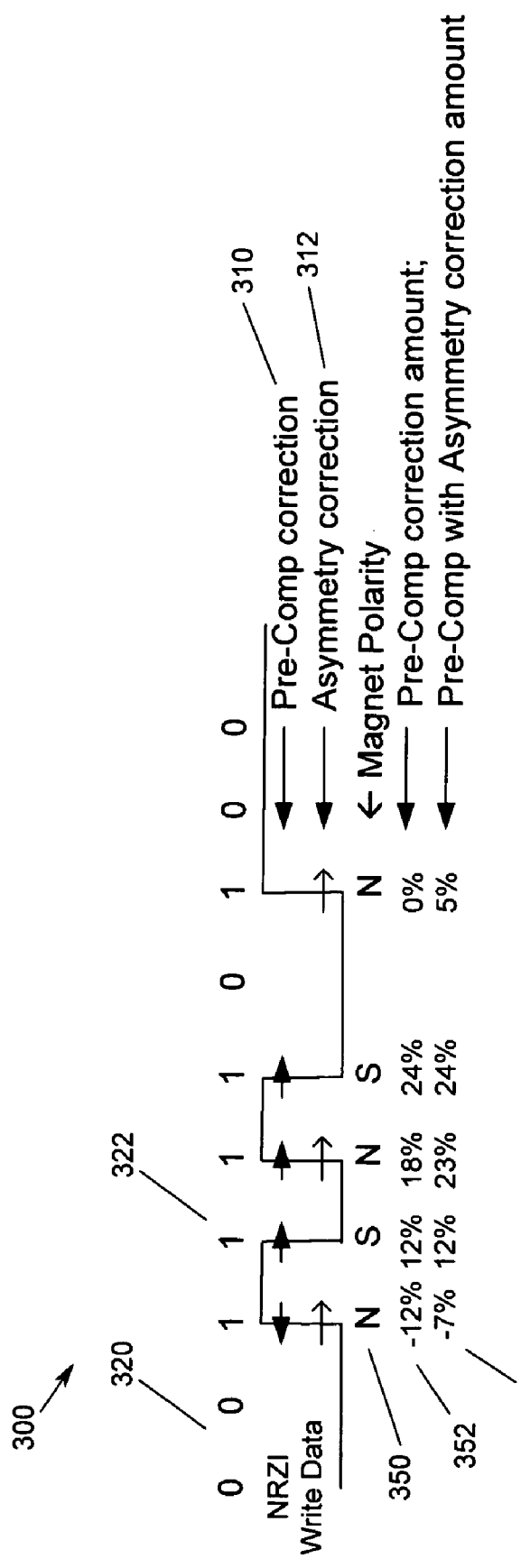
FIG. 3 illustrates generalized pre-compensation according to an embodiment of the present invention.

FIG. 3 illustrates generalized pre-compensation 300 according to an embodiment of the present invention. In FIG. 3, NRZI write data is provided with pre-compensation 310 and timing asymmetry 312 correction. The pattern shown in FIG. 3 includes a series of "0's" 320 and "1's" 322. The optimum read back signal may require, as an example, the first magnets to be shifted as shown in the diagram a percentage of one bit cell or one full rate period. If timing asymmetry is needed for the north (N) magnets of 5%, the total timing shift is the addition of pre-comp plus timing asymmetry correction 312. Thus, the pre-compensation for the first north (N) magnet 350 is −12% 352. However, because timing asymmetry is needed for the north (N) magnets of 5%, the composite adjustment of pre-compensation with asymmetry correction is −7% 354.

Figure 4:
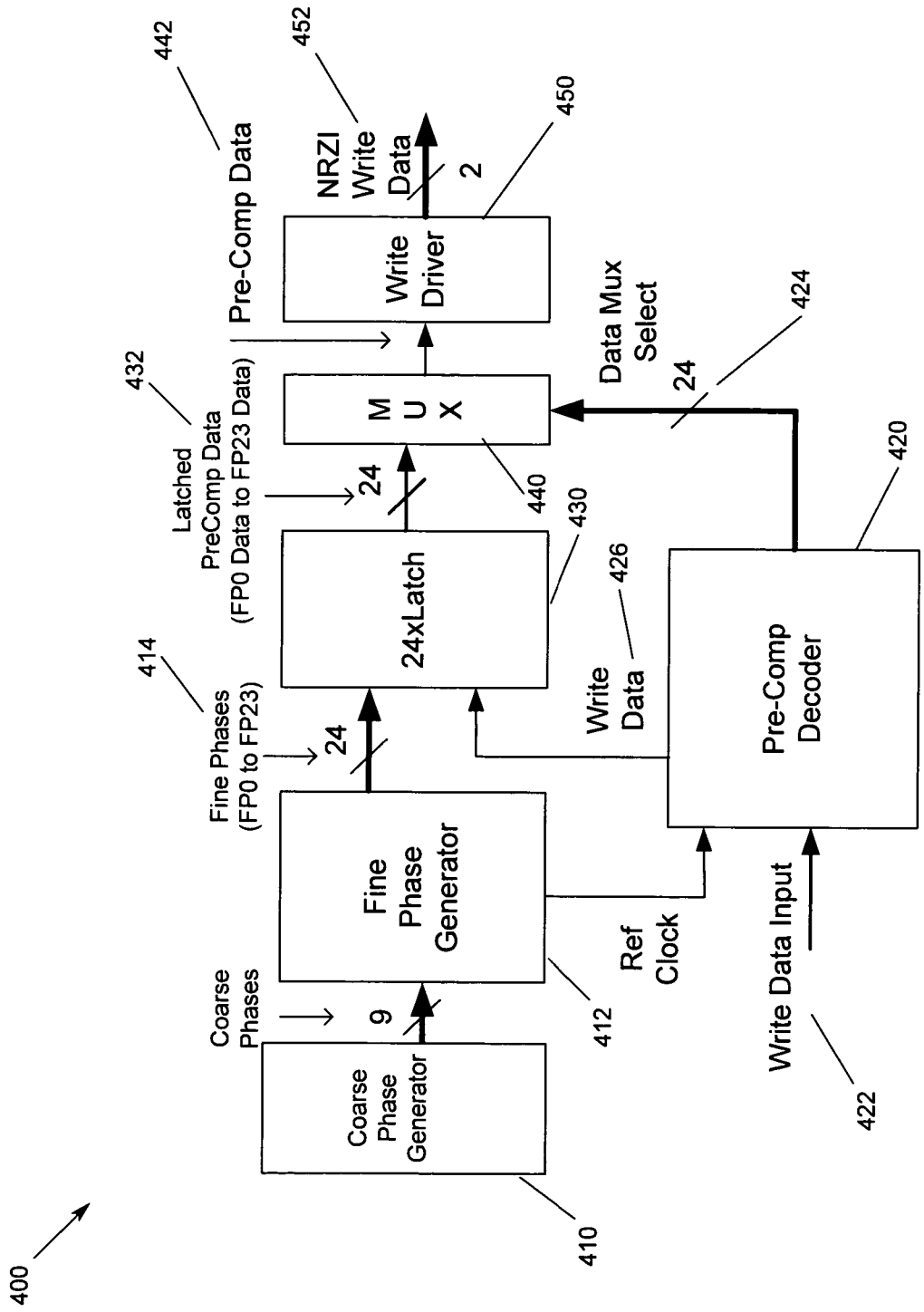
FIG. 4 is a block diagram of a circuit for providing pre-compensation according to an embodiment of the present invention.

FIG. 4 is a block diagram 400 of a circuit for providing pre-compensation according to an embodiment of the present invention. In FIG. 4, a coarse phase generator 410 drives a fine phase generator 412. The coarse phase generator 410 is a first level phase signal. In FIG. 4, the coarse phase generator 410 provides phase signals for driving the fine phase generator 412. The fine phase generator 412 is a second level or "finer" level of phase signal generator. The phase generators 410, 412 may also be referred to as interpolators.

A pre-compensation decoder 420 decides which phases to select at full rate based on the write data pattern 422. The phase step amount is determined by the pre-compensation step size desired. The fine phase signals 414 are labeled FP0 thru FP23. The fine phase signals 414 are used to latch the pre-compensation data in the 24×Latch 430. Each FPX signal 414 latches the same write data 426 and outputs a signal called FPX Data 432. Once the data is latched, the pre-compensation decoder 420 selects which phase is needed 424 based on the data pattern. The pre-compensation decoder 420 selects the lines of the Data Mux 440 based on the write data input pattern 422 and provides the pre-compensation data 442 to the write driver 450. The pre-compensation NRZI write data 452 is provided by the write driver 450. Thus, the coarse phase 410 and fine phase 412 generator circuits provide multiple timing delays to shift the data. The timing delays refer to signal delay created by selection among pre-compensated phases. The delay steps provide a predetermined number of different phases available from 0 to 360 degrees, however a given design could use less than 360 degrees. In FIG. 4, 24 delay settings are shown, not including various combinations of the 24. In order to have available the precise on-demand delays, all the delays need to be generated and then a delay is selected based on the write data sequence.

Figure 5:
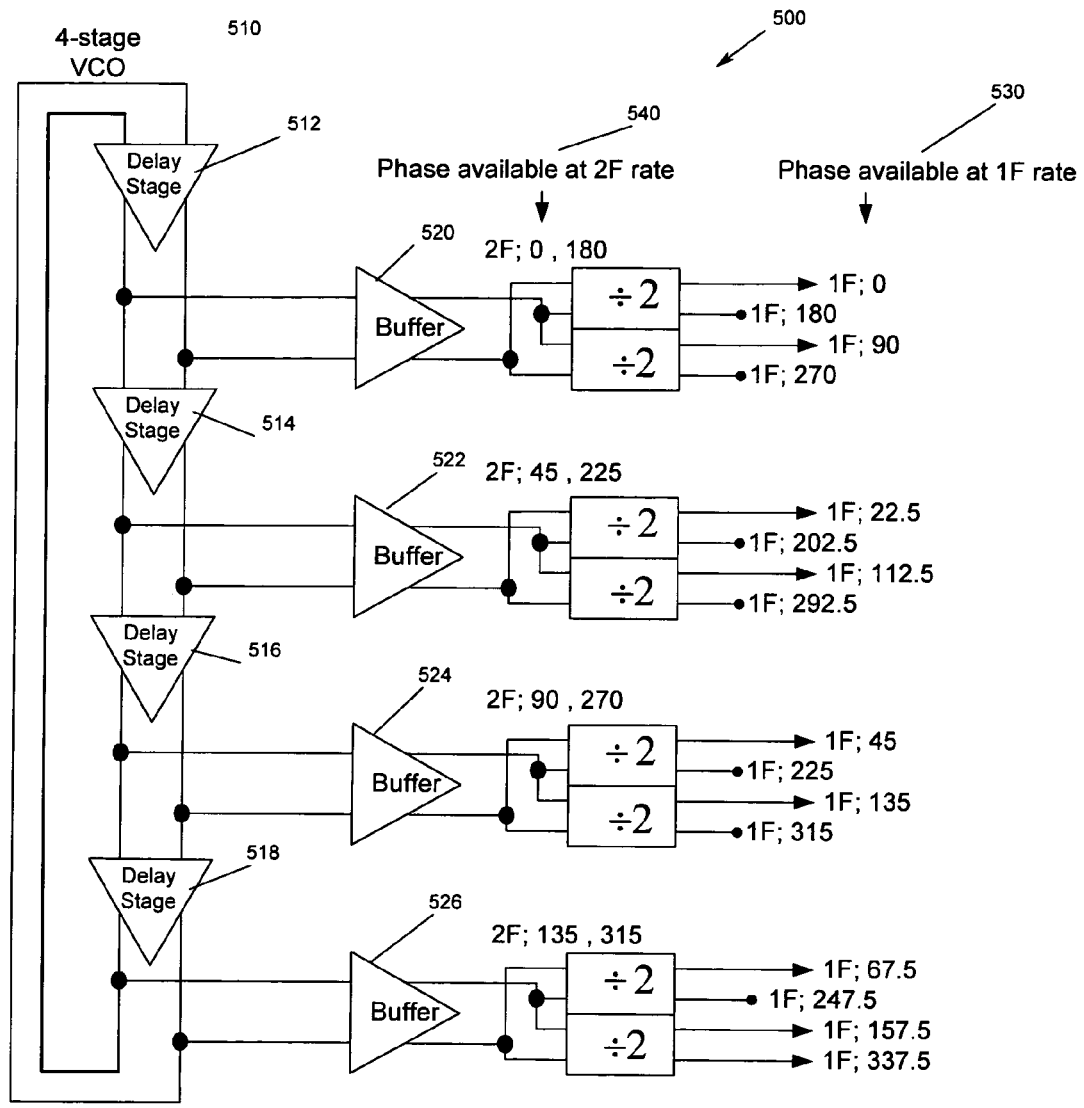
FIG. 5 illustrates the coarse phase generator block of FIG. 4 according to an embodiment of the present invention.

FIG. 5 illustrates a block diagram 500 of the coarse phase generator block of FIG. 4 according to an embodiment of the present invention. In FIG. 5, a four-stage VCO 510 and four delay stages 512–518 are shown. The outputs of the delay stages 512–518 are provided to buffers 520–526. The coarse phase generator block 500 provides a means to generate the coarse phases. The possible phases available from a 4-stage differential VCO are 0 thru 360 degrees in 45-degree increments 540. If the VCO runs at 2×F or 2 times the full rate needed for the write data, differential dividers can be used to generate phases of 0 thru 360 degrees in 22.5 degree steps 530.

Figure 6:
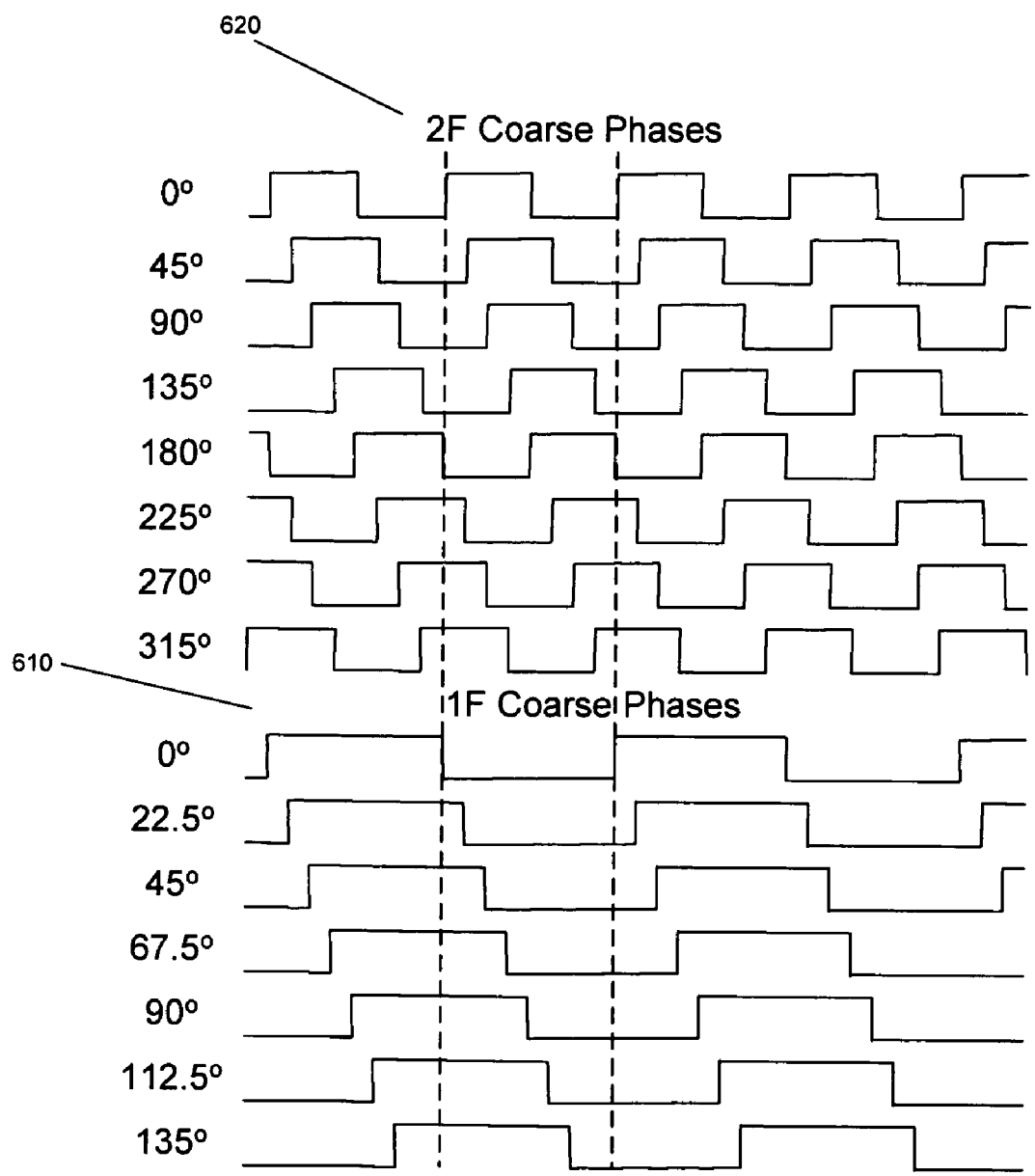
FIG. 6 shows the 1F and 2F coarse phase signals according to an embodiment of the present invention.

The amount of pre-compensation needed depends on the media and head. If ±36% of write pre-compensation is needed, the maximum coarse phase needed is 0.36*(360) =129.6 degrees. The closest coarse phase needed for pre-compensation is then 135 degrees. FIG. 5 shows how phases of 0 to 135 degrees in 22.5-degree step sizes 530 can be generated at the IF frequency rate, e.g., 0, 22.5, 45, 67.5, 90, 112.5, 135, 157.5, 180, 202.5, 225, 247.5, 270, 292.5, 315, 337.5. Phases above 135 degrees are not used by this particular pre-compensation, but any phase could be used depending on the magnitude of pre-compensation desired. When VCO runs at 2×F or 2 times the full rate needed for the write data, the step sizes 540 are 0, 180, 45, 225, 90, 270, 135, 315. FIG. 6 shows the 1F 610 and 2F 620 coarse phase signals according to an embodiment of the present invention.

Figure 7:
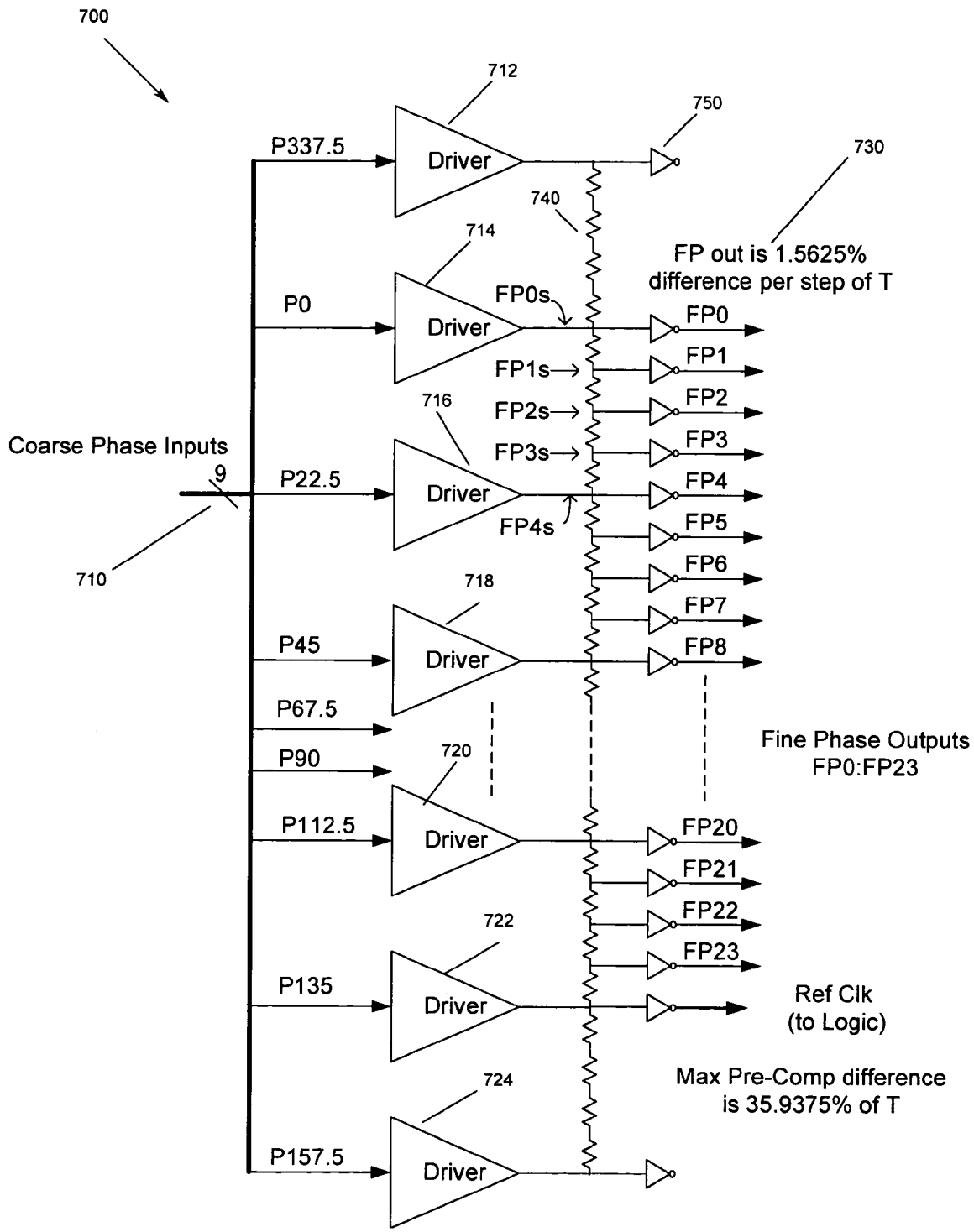
FIG. 7 is a block diagram of the fine phase circuit according to an embodiment of the present invention.

FIG. 7 is a block diagram of the fine phase circuit 700 according to an embodiment of the present invention. In FIG. 7, the course phase inputs 710 are provided to drivers 712–724. The phase step amount is determined by the pre-compensation step size desired. The fine phase signals are labeled FP0 thru FP23 730 and are generated by a voltage averaging technique. Serially tied resistors 740 are used between the drivers 712–724. The nodes from each resistor 740 are used to generate FP0 thru FP23 730. The output inverters 750 sharpen the signal to drive the next stage.

Figure 8:
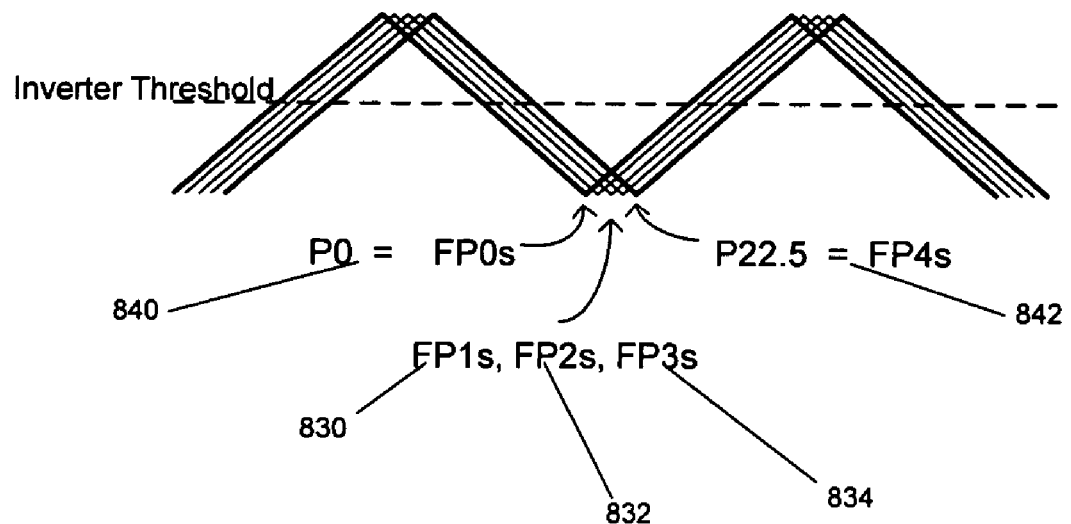
FIG. 8 illustrates how the intermediate nodes FP0s thru FP4s are generated according to an embodiment of the present invention.

FIG. 8 illustrates how the intermediate nodes FP0s thru FP4s are generated according to an embodiment of the present invention. In FIG. 8, lines 830–834 are fine phase signals FP1–FP3, i.e., voltage divider array with resistors of FIG. 7, wherein the coarse phase inputs 840, 842 are used to average/interpolate to create fine phase signals. To get the averaging technique to work properly, the slew rate of the FPXs nodes need to be set appropriately for the voltages to average correctly. The drivers should maximize the signal amplitude but not go quite the full supply swing. It maybe necessary to adjust the driver across silicon processes and temperature depending on the frequency range. Each phase step is 22.5/4=5.625 degrees, which is 1.5625% of the clock period T. With this particular design, a total of 24 fine phase signal are generated. Coarse phase signals P157.5 and P337.5 are extra phases to drive the resistor string. These end FP signals, FP0 and FP23, keep the voltage averaging on the ends of the resistor string at the correct amount for the correct phase delay step size amount.

Figure 9:
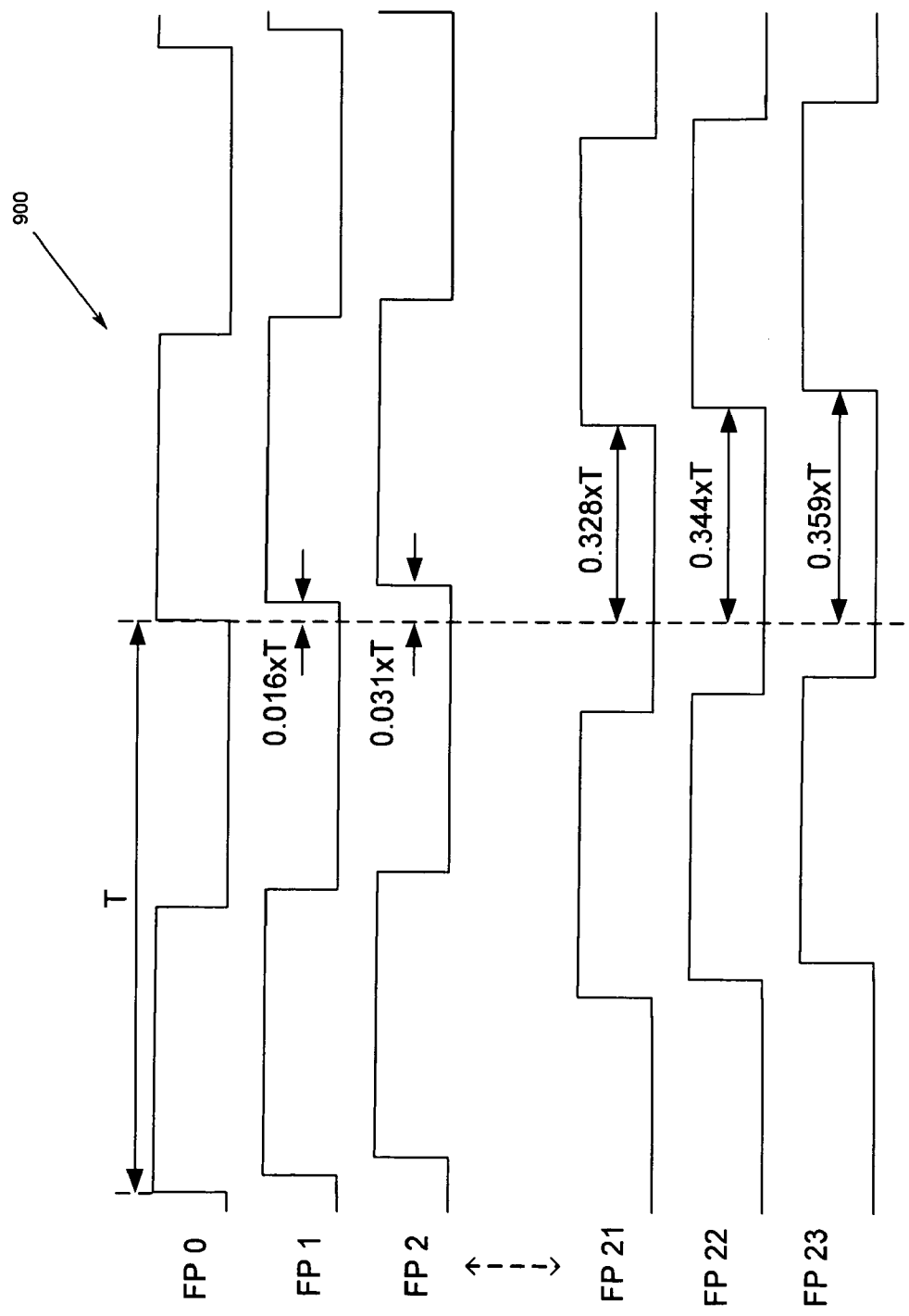
FIG. 9 illustrates another diagram of the fine phase signals according to an embodiment of the present invention.

FIG. 9 illustrates another diagram 900 of the fine phase signals according to an embodiment of the present invention. This illustrates the total phase movement of up to 35.9% of T and the sharper edges after the output inverters. The fine phase signals are used to latch the pre-compensation data in the 24×Latch shown in FIG. 4.

Figure 10:
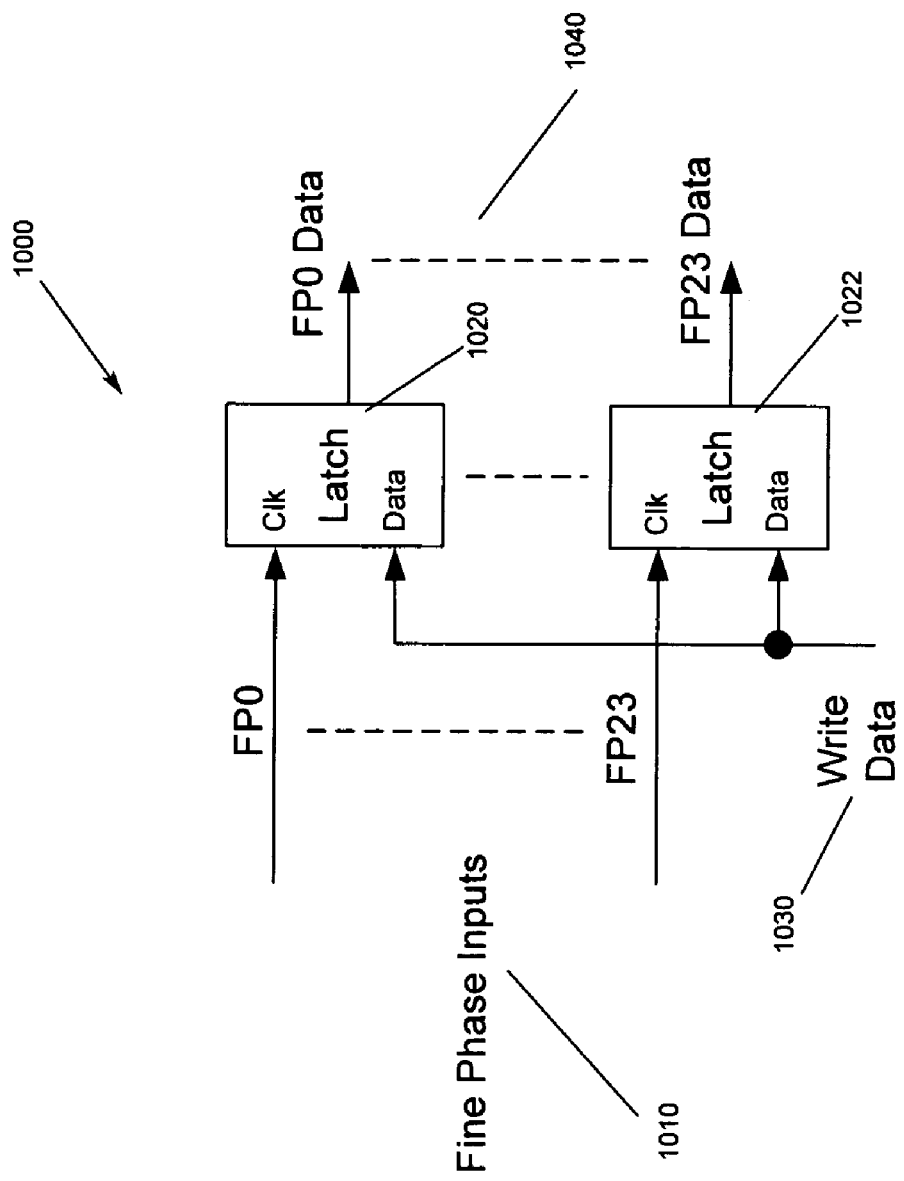
FIG. 10 is a block diagram of the 24×Latch block according to an embodiment of the present invention.

FIG. 10 is a block diagram of the 24×Latch block 1000 according to an embodiment of the present invention. The fine phase inputs 1010 are provided to clock the 24 latches 1020, 1022. Write data 1030 is provided to the data input ports of the 24 latches 1020, 1022. The write data 1030 is common for all 24 latches 1020, 1022. Each FPX signal 1010 latches the same write data 1030 and outputs a signal called FPX Data 1040.

Figure 11:
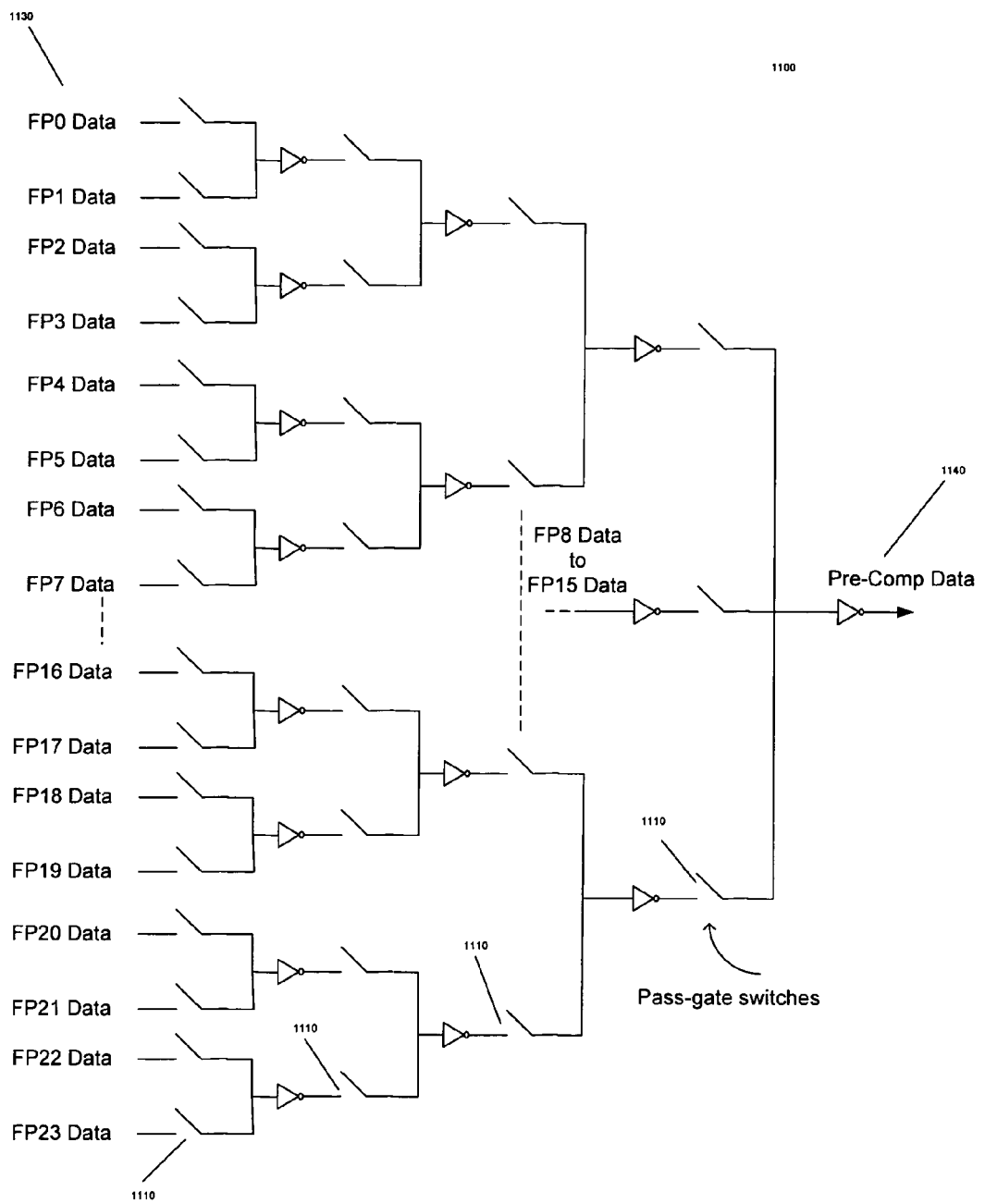
FIG. 11 is a block diagram of the pre-compensation Mux of FIG. 4 according to an embodiment of the present invention.

FIG. 11 is a block diagram 1100 of the pre-compensation Mux of FIG. 4 according to an embodiment of the present invention. Once the data is latched, the pre-compensation decoder selects which phase is needed based on the data pattern. The pre-compensation decoder selects which passgates 1110 to short to select the correct FPX Data 1130 to feed the write driver as pre-compensation data 1140.

Figure 12:
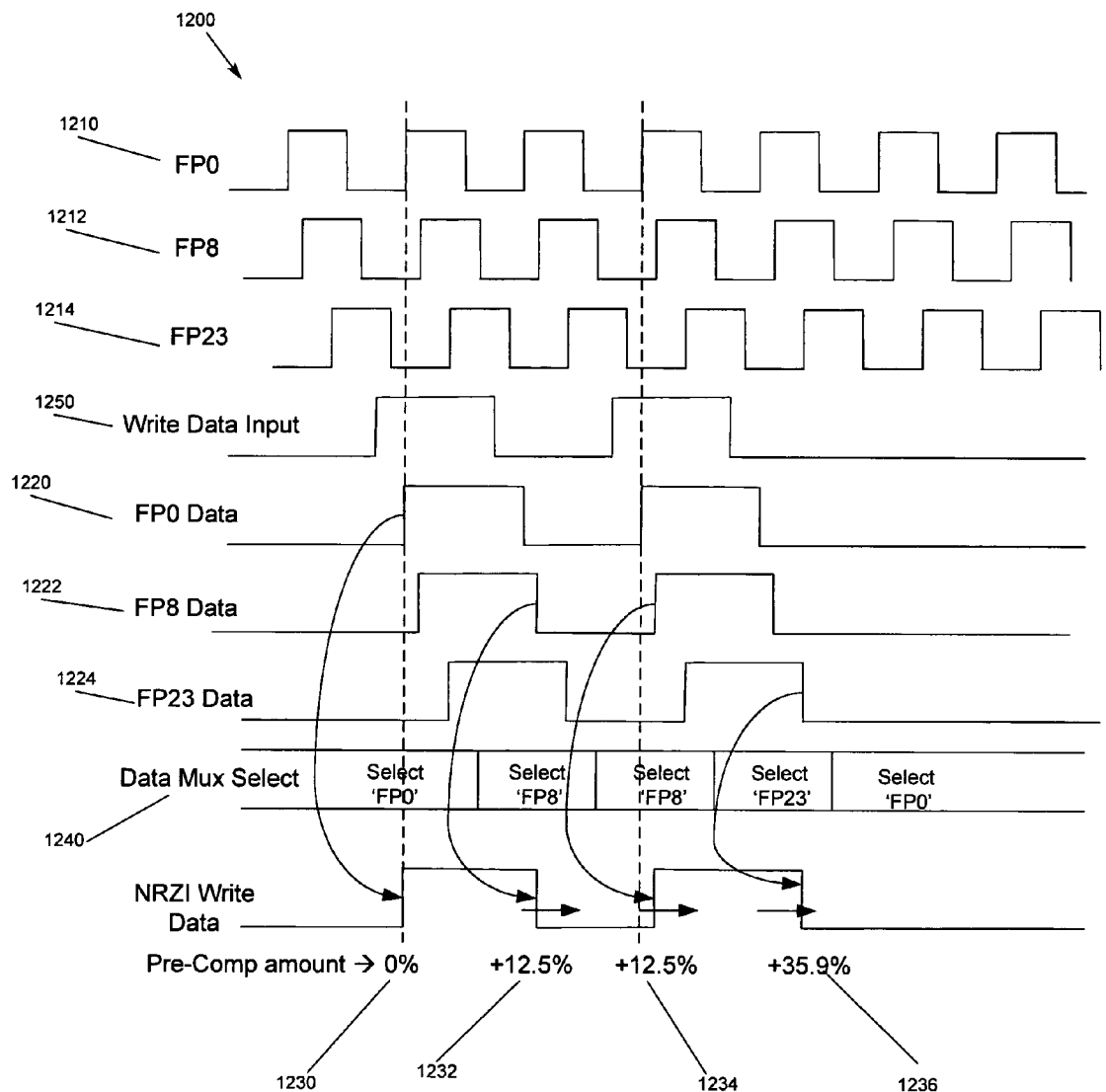
FIG. 12 is a timing diagram illustrating how the Mux selection timing is performed according to an embodiment of the present invention.

FIG. 12 is a timing diagram 1200 illustrating how the Mux selection timing is performed according to an embodiment of the present invention. FP0 1210, FP8 1212 and FP23 1214 are the fine phase signal chosen for this example and are the clocks used to latch the FP0 Data 1220, FP8 Data 1222 and FP23 Data 1224. The pre-compensation decoder drives the Data Mux Select 1240 to pick the proper sequence. In FIG. 12, the timing movement of the NRZI write data is 0% 1230, 12.5% 1232, 12.5% 1234 and 35.9% 1236. The pre-compensation decoder as shown in FIG. 4 selects the Data Mux Select lines based on the write data input pattern 1250. The designer can decide how the pattern recognition is to be done based on the media recording technology. The design is flexible enough so that 2, 4, 8 or even 16 states of pre-compensation may be chosen.

FIG. 13 shows an example of a customer setting for pre-compensation and the decoder select based on the NRZI write data for a 4-state pre-compensation 1300 according to an embodiment of the present invention. The middle (underlined '1') NRZI Data transition 1310 is the bit that is shifted the given amount based on the neighboring transitions 1 bit cell before 1312 and 1 bit cell after 1314. So for pre-compensation state of 1, the customer setting of −12.5% pre-compensation shift 1320 would need FP0 1330 selected for that transition. Regardless of how many states are chosen the maximum difference in pre-compensation amount is 35.9% for this given design example. So, FP23-FP0= 23.5%-(−12.5%)=35.9%. It's arbitrary where the customer sets the 0% reference. Each pre-compensation state has a relative variable range of 0% to 35.9%.

FIG. 14 shows an example of how an 8-state pre-compensation 1400 may be decoded according to an embodiment of the present invention. An 8-state pre-compensation may be performed in a similar way, except the amount of shift is based on two previous bit cells 1412 and 1 after 1414.

FIG. 15 shows a partial table of how a 16-state decoder 1500 may be implemented according to an embodiment of the present invention. Future recording technology may require a 16-state pre-compensation where the amount of shift is dependent on looking at the 2 previous bit cells 1512 and 2 after 1514.

The amount of states is only limited by the needs and number of delay steps available. While the present invention has been illustrated with only 24 available delay settings, the number of states can be increased or decreased. In any of these states the decoder may need to change the state based on timing asymmetry requirements. As described before, a north magnet can be shifted and added to the pre-compensation amount for that transition. So in reality a 4-state pre-compensation is doubled to become an 8-state pre-compensation when the timing asymmetry correction is added. The decoder only needs to keep track of alternating 1's and add the selected asymmetry amount.

Moreover, embodiments of the present invention may be implemented provide a wide frequency range by extending these concepts. As stated before, the fine phase generator operates correctly when the slew rate at the FPXs nodes in the fine phase generator are in the correct operating range. However, as the frequency increases the FPXs node signal swing has a limited bandwidth and will decrease. A practical useable frequency range is about 2 to 1. Frequency ranges above this would need to vary the slew rates of the FPXs nodes. One solution is to have a variable edge rate driver in the fine phase generator. However, this requires some type of calibration to understand the process speed and temperature. A better way is to obtain a wider frequency range of about 4 to 1 would be to switch the coarse phase signals driving the fine phase generator and to add an M divider in the Reference Clock.

Figure 16:
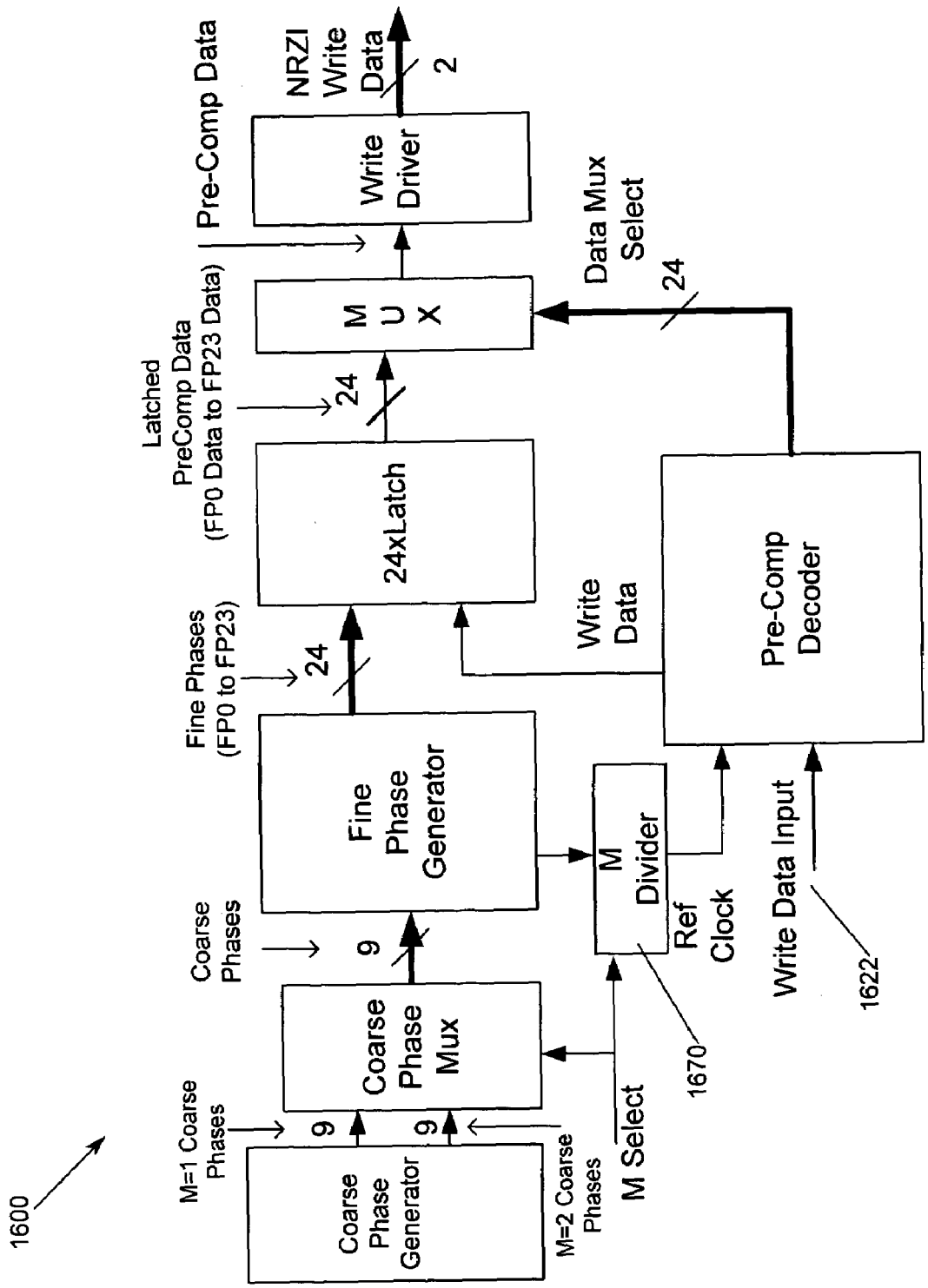
FIG. 16 is a block diagram of a circuit for providing generalized pre-compensation with an M divider according to an embodiment of the present invention.

FIG. 16 is a block diagram 1600 of a circuit for providing generalized pre-compensation with an M divider 1670 according to an embodiment of the present invention. The M divider 1670 is preferably either 1 or 2. When the M divider 1670 is 2, the Write Data 1622 is divided by 2 and the bit cell is then 2×T. The pre-compensation percentage is effectively divided by 2 because the bit cell is twice as long. Therefore, for M=2 the maximum pre-compensation would be only 35.9%/2=18.0%. To get the same maximum pre-compensation percentage of 35.9% for M=2, a different set of coarse phases can be selected. FIG. 17 shows a coarse phase Mux block 1700 that selects a different set of coarse phases when M=2. FIG. 17 shows a table illustrating the coarse phase selection for an M divider of 1 1710 and an M divider of 2 1712. For M=2 1712 the coarse phase needs to be doubled to keep the same pre-compensation percentage shift.

Figure 18:
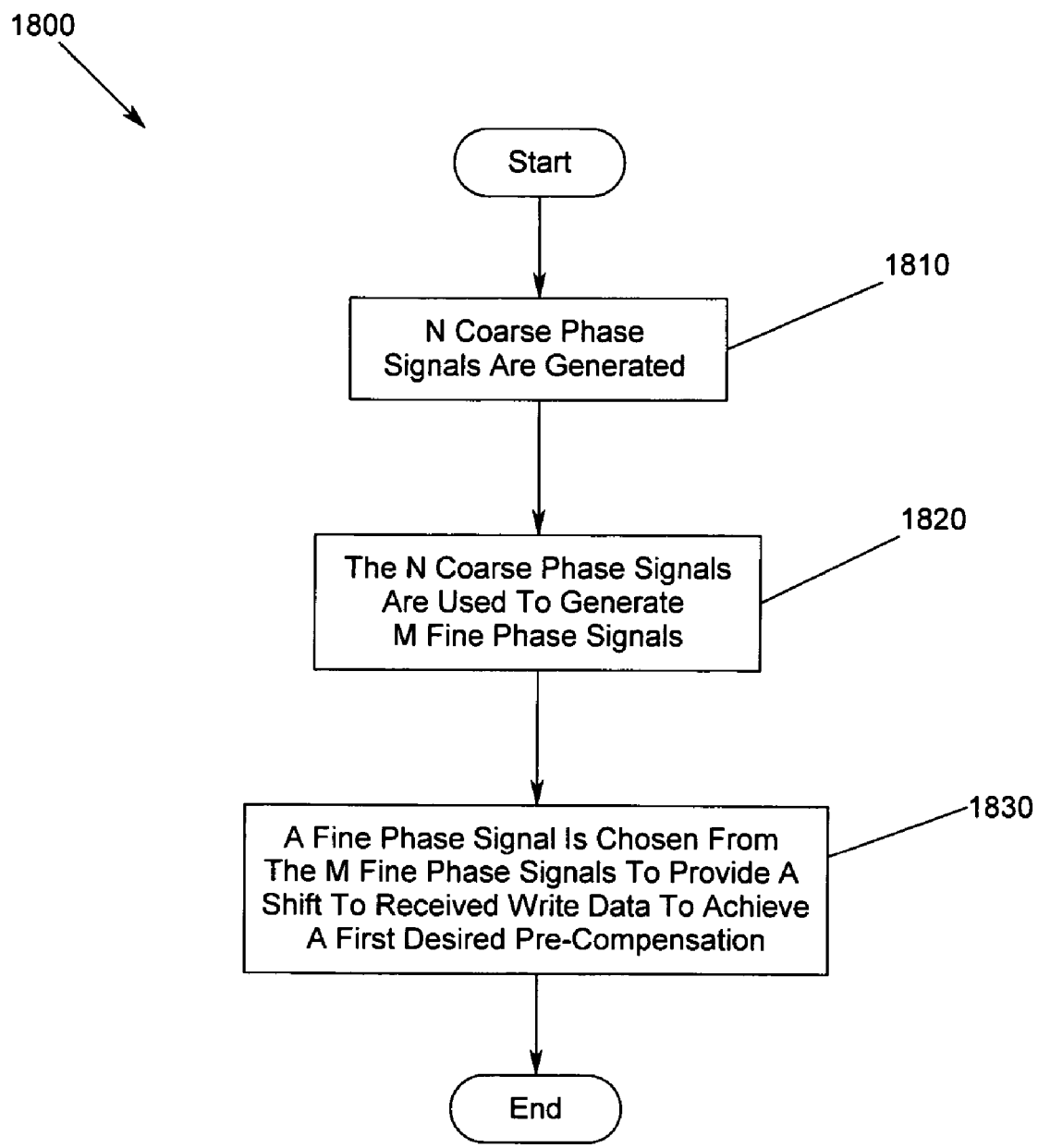
FIG. 18 is a flow chart of the method for providing generalized write pre-compensation according to an embodiment of the present invention.

FIG. 18 is a flow chart 1800 of the method for providing generalized write pre-compensation according to an embodiment of the present invention. First, N coarse phase signals are generated 1810. The N coarse phase signals are used to generate M fine phase signals 1820. A fine phase signal is chosen from the M fine phase signals to provide a shift to received write data to achieve a first desired pre-compensation 1830.

The process illustrated with reference to FIGS. 1–18 may be tangibly embodied in a computer-readable medium or carrier, e.g. one or more of the fixed and/or removable data storage devices 188 illustrated in FIG. 1, or other data storage or data communications devices. The computer program 190 may be loaded into memory 170 to configure the processor 172 for execution of the computer program 190. The computer program 190 include instructions which, when read and executed by a processor 172 of FIG. 1, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A circuit for providing generalized write pre-compensation, comprising:
    a coarse phase generator for generating N coarse phase signals;
    a fine phase generator, coupled to the coarse phase generator, for using the N coarse phase signals to generate M fine phase signals; and
    a write pre-compensation circuit, coupled to the fine phase generator, for choosing a fine phase signal from the M fine phase signals to provide a shift to received write data to achieve a first desired pre-compensation.

2. The circuit of claim 1, wherein the fine phase signal chosen provides a shift to received write data to achieve a first desired positive pre-compensation.

3. The circuit of claim 1, wherein the fine phase signal chosen provides a shift to received write data to achieve a first desired negative pre-compensation.

4. The circuit of claim 1, wherein the fine phase signal is chosen to further provide a shift to received write data to achieve positive or negative timing asymmetry correction.

5. The circuit of claim 1, wherein the coarse phase generator comprises a X stage differential ring VCO running at a first frequency and providing 2X phase signals of 0° to 360° in 360°/(2X) increments.

6. The circuit of claim 1, wherein the coarse phase generator comprises a X stage differential ring VCO running at a second frequency, the coarse phase generator further comprises differential dividers and provides 4X phase signals of 0° to 360° in 360°/(8X) increments.

7. The circuit of claim 1, wherein the fine phase generator comprises an interpolator for providing voltage averaging to generate the M fine phase signals.

8. The circuit of claim 7, wherein the fine phase generator further comprises drivers receiving one of the N coarse phase signals and serially coupled resistors disposed between the drivers for generating the M fine phase signals.

9. The circuit of claim 1, wherein the write pre-compensation circuit further comprises:
    a pre-compensation decoder, coupled to the fine phase generator, the pre-compensation decoder receiving a reference clock from the fine phase generator, the pre-compensation decoder receiving the write data;
    a latch circuit, coupled to the fine phase generator and the pre-compensation decoder, the latch circuit being supplied the write data from the pre-compensation decoder and the M fine phase clock signals, the latch circuit supplying M latched write data signals shifted according to the M fine phase clock signals; and
    a data selector, coupled to the latch circuit and the pre-compensation decoder, the data selector receiving a data selection signal from the pre-compensation decoder for indicating to the data selector which of the shifted M latched write data signals to provide as pre-compensated write data.

10. The circuit of claim 9 further comprises a write driver, the write driver receiving the pre-compensated write data and outputting NRZI write data.

11. The circuit of claim 10, wherein a shifted M latched write data signal is chosen to further provide a shift to received write data to achieve timing asymmetry correction.

12. The circuit of claim 9 further comprising a divider for dividing the reference clock to increase a slew rate of the M fine phase clock signals and to provide a wider frequency range for the M fine phase clock signals, the coarse phase clock signals used is changed to provide the first desired pre-compensation.

13. A magnetic storage device, comprising:
    a magnetic storage medium for recording data thereon;
    a motor for moving the magnetic storage medium;
    a head for reading and writing data on the magnetic storage medium;
    an actuator for positioning the head relative to the magnetic storage medium; and
    a data channel for processing encoded signals on the magnetic storage medium, the data channel comprising a coarse phase generator for generating N coarse phase signals, a fine phase generator, coupled to the coarse phase generator, for using the N coarse phase signals to generate M fine phase signals and a write pre-compensation circuit, coupled to the fine phase generator, for choosing a fine phase signal from the M fine phase signals to provide a shift to received write data to achieve a first desired pre-compensation.

14. The magnetic storage device of claim 13, wherein the fine phase signal chosen provides a shift to received write data to achieve a first desired positive pre-compensation positive pre-compensation.

15. The magnetic storage device of claim 13, wherein the fine phase signal chosen provides a shift to received write data to achieve a first desired negative pre-compensation positive pre-compensation.

16. The magnetic storage device of claim 13, wherein the fine phase signal is chosen to further provide a shift to received write data to achieve timing asymmetry correction.

17. The magnetic storage device of claim 13, wherein the coarse phase generator comprises a X stage differential ring VCO running at a first frequency and providing 2X phase signals of 0° to 360° in 360°/(2X) increments.

18. The magnetic storage device of claim 13, wherein the coarse phase generator comprises a X stage differential ring VCO running at a second frequency, the coarse phase generator further comprises differential dividers and provides 4X phase signals of 0° to 360° in 360°/(8X) increments.

19. The magnetic storage device of claim 13, wherein the fine phase generator comprises an interpolator for providing voltage averaging to generate the M fine phase signals.

20. The magnetic storage device of claim 19, wherein the fine phase generator further comprises drivers receiving one of the N coarse phase signals and serially coupled resistors disposed between the drivers for generating the M fine phase signals.

21. The magnetic storage device of claim 13, wherein the write pre-compensation circuit further comprises:
- a pre-compensation decoder, coupled to the fine phase generator, the pre-compensation decoder receiving a reference clock from the fine phase generator, the pre-compensation decoder receiving the write data;
- a latch circuit, coupled to the fine phase generator and the pre-compensation decoder, the latch circuit being supplied the write data from the pre-compensation decoder and the M fine phase clock signals, the latch circuit supplying M latched write data signals shifted according to the M fine phase clock signals; and
- a data selector, coupled to the latch circuit and the pre-compensation decoder, the data selector receiving a data selection signal from the pre-compensation decoder for indicating to the data selector which of the shifted M latched write data signals to provide as pre-compensated write data.

22. The magnetic storage device of claim 21 further comprises a write driver, the write driver receiving the pre-compensated write data and outputting NRZI write data.

23. The magnetic storage device of claim 22, wherein a shifted M latched write data signal is chosen to further provide a shift to received write data to achieve timing asymmetry correction.

24. The magnetic storage device of claim 21 further comprising a divider for dividing the reference clock to increase a slew rate of the M fine phase clock signals and to provide a wider frequency range for the M fine phase clock signals, the coarse phase clock signals used is changed to provide the first desired pre-compensation.

25. A method for providing generalized write pre-compensation, comprising:
- generating N coarse phase signals;
- using the N coarse phase signals to generate M fine phase signals; and
- choosing a fine phase signal from the M fine phase signals to provide a shift to received write data to achieve a first desired pre-compensation.

26. The method of claim 25, wherein the choosing a fine phase signal further comprises choosing a fine phase signal to achieve a first desired positive pre-compensation.

27. The method of claim 25, wherein the choosing a fine phase signal further comprises choosing a fine phase signal to achieve a first desired negative pre-compensation.

28. The method of claim 25, wherein the choosing a fine phase signal further comprises choosing a fine phase signal to further provide a shift to received write data to achieve positive or negative timing asymmetry correction.

29. The method of claim 25, wherein the generating N coarse phase signals further comprises providing X phase signals of 0° to 360° in 360°/X increments.

30. The method of claim 25, wherein the generating N coarse phase signals further comprises providing 2X phase signals of 0° to 360° in 360°/(2X) increments.

31. The method of claim 25, wherein the using the N coarse phase signals to generate M fine phase signals further comprises providing voltage averaging to the N coarse phase signals to generate the M fine phase signals.

32. The method of claim 25, wherein the choosing a fine phase signal from the M fine phase signals to provide a shift to received write data to achieve a first desired pre-compensation further comprises:
- shifting write data according to the M fine phase clock signals to produce M shifted write data signals; and
- in response to receiving a reference clock and write data, supplying a data selection signal to choose one of the M shifted write data signals to provide as pre-compensated write data.

33. The method of claim 32, wherein the supplying a data selection signal to choose one of the M shifted write data signals to further achieve timing asymmetry correction for the write data.

34. The method of claim 32 further comprising:
- dividing the reference clock to increase a slew rate of the M fine phase clock signals and to provide a wider frequency range for the M fine phase clock signals; and
- changing the coarse phase clock signals used to provide the first desired pre-compensation.

* * * * *